(12) United States Patent
Imagawa et al.

(10) Patent No.: US 8,059,770 B2
(45) Date of Patent: Nov. 15, 2011

(54) DIVERSITY RECEIVING DEVICE

(75) Inventors: Yasumi Imagawa, Ishikawa (JP);
Kazuhiko Nakayama, Ishikawa (JP);
Makoto Sasaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 643 days.

(21) Appl. No.: 12/297,827

(22) PCT Filed: Apr. 20, 2006

(86) PCT No.: PCT/JP2006/308335
§ 371 (c)(1),
(2), (4) Date: Oct. 20, 2008

(87) PCT Pub. No.: WO2007/122714
PCT Pub. Date: Nov. 1, 2007

(65) Prior Publication Data
US 2009/0238314 A1    Sep. 24, 2009

(51) Int. Cl.
*H04B 7/10* (2006.01)
*H04L 1/02* (2006.01)

(52) U.S. Cl. ........ 375/347; 375/267; 375/144; 375/148; 375/260; 375/349; 455/500; 455/101

(58) Field of Classification Search .................. 375/347, 375/349, 346, 267, 144, 148, 260; 455/500, 455/101
See application file for complete search history.

(56) References Cited

U.S. PATENT DOCUMENTS

| | | | | |
|---|---|---|---|---|
| 5,455,844 A | * | 10/1995 | Ishikawa et al. | 375/232 |
| 7,221,963 B2 | * | 5/2007 | Ishihara et al. | 455/562.1 |
| 7,327,990 B2 | * | 2/2008 | Kimata | 455/101 |
| 2004/0229581 A1 | * | 11/2004 | Mizoguchi et al. | 455/136 |
| 2005/0113048 A1 | | 5/2005 | Miyahara et al. | |
| 2006/0133544 A1 | * | 6/2006 | Kawada et al. | 375/343 |
| 2006/0165199 A1 | * | 7/2006 | Takemoto et al. | 375/347 |
| 2006/0166634 A1 | * | 7/2006 | Ido | 455/277.1 |

FOREIGN PATENT DOCUMENTS

| | | |
|---|---|---|
| JP | 06-284062 | 10/1994 |
| JP | 11-150497 | 6/1999 |
| JP | 2000-183793 | 6/2000 |
| JP | 2000-357983 | 12/2000 |
| JP | 2004-320528 | 11/2004 |
| JP | 2005-039479 | 2/2005 |
| JP | 2005-159539 | 6/2005 |

OTHER PUBLICATIONS

International Search Report for PCT/JP2006-308335; May 11, 2006.

* cited by examiner

*Primary Examiner* — Phuong Phu

(74) *Attorney, Agent, or Firm* — Pearne & Gordon LLP

(57) ABSTRACT

It is a theme of the present invention to provide a diversity receiving device capable of reducing a power consumption to the utmost extent while keeping a predetermined received quality without measurement of an electric field strength and a fading pitch. A decision about whether or not the diversity reception is executed is made by sensing a received quality. Also, a diversity gain is reduced by a predetermined value by controlling the diversity gain in the diversity reception, then a receiving operation of a predetermined branch or a branch whose received quality is low is stopped when the received quality at that time is in excess of a previously set value, and then a supply of power to all circuit or a partial circuit of the branch whose receiving operation is stopped is shut down. Accordingly, a power consumption can be reduced to the utmost extent while keeping a predetermined received quality.

9 Claims, 7 Drawing Sheets

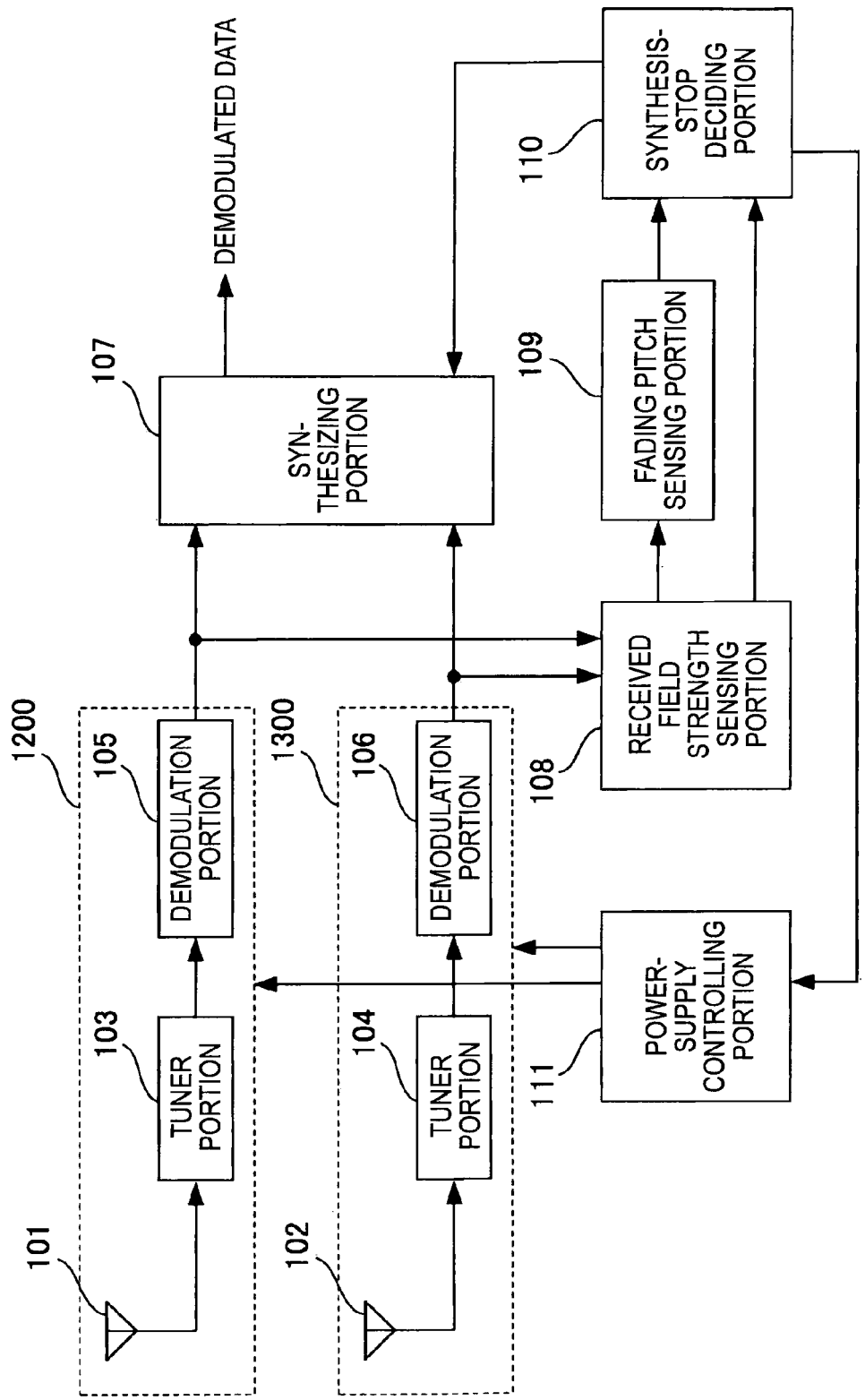

DIVERSITY RECEIVING DEVICE

TECHNICAL FIELD

The preset invention relates to a diversity receiving device equipped with a plurality of receiving systems and capable of executing a diversity reception.

BACKGROUND ART

In the prior art, as shown in FIG. 7, the diversity receiving device that is equipped with a plurality of receiving systems and executes the diversity reception has been proposed (see Patent Literature 1, for example). The conventional diversity receiving device shown in FIG. 7 is constructed to include two antennas 101, 102 used as diversity antennas, a tuner portion 103 for turning in to a desired channel from a digital modulation signal caught by the antenna 101, a tuner portion 104 for turning in to a desired channel from a digital modulation signal caught by the antenna 102, a demodulating portion 105 for demodulating a signal on the channel chosen by the tuner portion 103, a demodulating portion 106 for demodulating a signal on the channel chosen by the tuner portion 104, a synthesizing portion 107 for synthesizing the signal demodulated by the demodulating portion 105 and the signal demodulated by the demodulating portion 106, a received field strength sensing portion 108 for sensing a received field strength based on the signal demodulated by the demodulating portion 105 and the signal demodulated by the demodulating portion 106, a fading pitch sensing portion 109 for sensing a fading pitch based on the received field strength sensed by the received field strength sensing portion 108, a synthesis-stop deciding portion 110 for deciding a stop of a signal synthesis in the synthesizing portion 107 based on the fading pitch sensed by the fading pitch sensing portion 109 and the received field strength sensed by the received field strength sensing portion 108, and a power-supply controlling portion 111 for ON/OF-controlling a power supply of the block whose power supply should be shut down when the diversity operation is stopped.

Here, the antenna 101, the tuner portion 103, and the demodulating portion 105 and the antenna 102, tuner portion 104, the demodulating portion 106 constitute one receiving system respectively. The former receiving system is called a first branch 1200, and the latter receiving system is called a second branch 1300.

Next, an operation of the diversity receiving device constructed as above will be explained hereunder. The tuner portion 103 turns in to the desired channel from the digital modulation signal caught by the antenna 101. At the same time, the tuner portion 103 also turns in to the desired channel from the digital modulation signal caught by the antenna 102. Then, the signal on the channel chosen by the tuner portion 103 is demodulated by the demodulating portion 105, and the signal on the channel chosen by the tuner portion 104 is demodulated by the demodulating portion 106. Then, signals demodulated by the demodulating portions 105 and 106 respectively are synthesized by the synthesizing portion 107, and a synthesized signal is output as demodulated data. Also, the signals demodulated by the demodulating portions 105 and 106 respectively are input into the received field strength sensing portion 108, and the received field strength is calculated. The field strength value calculated by the received field strength sensing portion 108 is input into the fading pitch sensing portion 109, and the fading pitch is sensed.

Then, the fading pitch and the field strength value are input into the synthesis-stop deciding portion 110, a threshold best suited to stop the synthesis is calculated based on a value of the fading pitch. Then, when the field strength value satisfies the threshold, a command to stop a synthesizing operation is sent to the synthesizing portion 107 from the synthesis-stop deciding portion 110. Also, a command to stop a supply of power to the unnecessary branch is sent to the power-supply controlling portion 111 from the synthesis-stop deciding portion 110. For example, when a command to stop a supply of power to the first branch 1200 is issued, a supply of power to the first branch 1200 is stopped. Accordingly, only the demodulated signal from the second branch 1300 is input into the synthesizing portion 107. Then, the demodulated signal from the second branch 1300 is output as demodulated data. In this manner, the diversity receiving device in the prior art implements a lower power consumption in such a way that the fading pitch is sensed, then the diversity stop conditions that are most suitable in the present fading circumstance is decided, and either the synthesis is stopped or the supply of power to the unnecessary branch is stopped.

Patent Literature 1: JP-A-2000-357983

DISCLOSURE OF THE INVENTION

Problems that the Invention is to Solve

However, the conventional diversity receiving device in the prior art makes a decision about whether or not the diversity reception should be executed, based on the field strength or the fading pitch. Therefore, such a problem arises that, because the received field strength sensing portion 108 for sensing the received field strength and the fading pitch sensing portion 109 for sensing the fading pitch must be provided, a circuit scale is increased and a cost adds up.

Also, a variation in level of the field strength is caused due to the Doppler effect in the fading circumstance. In this situation, when a time to measure a level of the electric field variation is smaller than a period of the fading pitch, the electric field level can be measured stably because several periods of the electric field level are present within the measuring time. However, when a time to measure the level of the electric field variation is larger than the period of the fading pitch, the level variation in the in-progress state is present within the measuring time. Thus, a correct value of the electric field level cannot be measured, and thus it is difficult to calculate correctly the fading pitch. For this reason, there are the problems such that the diversity is stopped on account of the wrong decision to bring about a deterioration of the received quality and that a reduction rate of the power consumption is lowered because the stop of the diversity cannot be decided.

The present invention has been made in view of such circumstances, and it is an object of the present invention to provide a diversity receiving device capable of reducing a power consumption to the utmost extent while keeping a predetermined received quality without measurement of an electric field strength and a fading pitch.

Means for Solving the Problems

The above object can be achieved by configurations and methods given as follows.

A diversity receiving device of the present invention for switching a receiving mode between a diversity reception using a plurality of branches and a single reception using a single branch, includes a diversity synthesis/non-synthesis switching portion for switching a receiving mode between the diversity reception and the single reception; a received quality sensing portion for sensing a received quality; and a controlling portion for reducing a diversity gain by a predetermined value by controlling the diversity synthesis/non-synthesis switching portion in the diversity reception, and then stopping a receiving operation of a predetermined branch or a branch whose received quality is low when the received quality sensed by the received quality sensing portion is equal to or greater than a previously set value.

In the diversity receiving device of the present invention, the controlling portion shuts down a supply of power to all circuit or a partial circuit of the branch whose receiving operation is stopped.

In the diversity receiving device of the present invention, the diversity synthesis/non-synthesis switching portion controls an ON/OFF ratio of the diversity receiving operation periodically or at random to vary the diversity gain.

In the diversity receiving device of the present invention, the diversity synthesis/non-synthesis switching portion senses a gain difference between the branches, and the diversity synthesis/non-synthesis switching portion is controlled in response to a result.

In the diversity receiving device of the present invention, the controlling portion lowers the diversity gain when a state that the received quality is equal to or greater than a first threshold is obtained continuously for a time t1 or more in the diversity reception, lowers further the diversity gain when a state that the received quality is equal to or greater than a second threshold is obtained after a time t2 that passes through the time t1, executes stop control of the concerned branch when the received quality is equal to or greater than the second threshold after the time t2 elapsed in a state that the diversity gain is lowered up to a previously set lower limit, and stops a gain varying operation when the received quality is smaller than the second threshold after the time t2 elapsed after the diversity gain is lowered.

In the diversity receiving device of the present invention, when a transmission parameter for deciding a range of a time interleave for an OFDM-modulated signal is changed, the controlling portion changes a time t2 being set previously a time interleave parameter into a time t3.

A mobile terminal equipped with any one of the diversity receiving devices.

A diversity receiving method of the present invention of switching a receiving mode between a diversity reception using a plurality of branches and a single reception using a single branch, includes the processes of sensing a received quality; controlling a ratio of a diversity synthesis/non-synthesis periodically or at random; reducing a diversity gain by a predetermined value by controlling a diversity synthesis/non-synthesis switch in the diversity reception; and stopping a receiving operation of a predetermined branch or a branch whose received quality is low when the received quality sensed by the received quality sensing portion is equal to or greater than a previously set value.

A diversity receiving method of the present invention of switching a receiving mode between a diversity reception using a plurality of branches and a single reception using a single branch, includes the processes of sensing a received quality; controlling a ratio of a diversity synthesis/non-synthesis by controlling a gain of high-frequency amplifier circuit of each branch or a weighting of an output of each branch; reducing a diversity gain by a predetermined value by controlling a diversity synthesis/non-synthesis switch in the diversity reception; and stopping a receiving operation of a predetermined branch or a branch whose received quality is low when the received quality sensed by the received quality sensing portion is equal to or greater than a previously set value.

ADVANTAGES OF THE INVENTION

The diversity receive of the present invention makes a decision about whether or not the diversity reception should be executed, by using the received quality that is not influenced by the fading condition (e.g., a bit error rate, or a packet error rate). Therefore, a circuit scale can be reduced rather than the prior art where a decision is made based on the field strength or the fading pitch, and a reduction of a cost can be attained. Also, a diversity gain is controlled in receiving the diversity such that the diversity gain is lowered by a predetermined value, and then a receiving operation of either the predetermined branch or the branch whose received quality is lower is stopped when the received quality at that time is in excess of a previously set value. Therefore, a reduction of the power consumption can be attained.

BRIEF DESCRIPTION OF THE DRAWINGS

FIG. 7 is a block diagram showing a schematic configuration of a diversity receiving device in the prior art.

Figure 1:
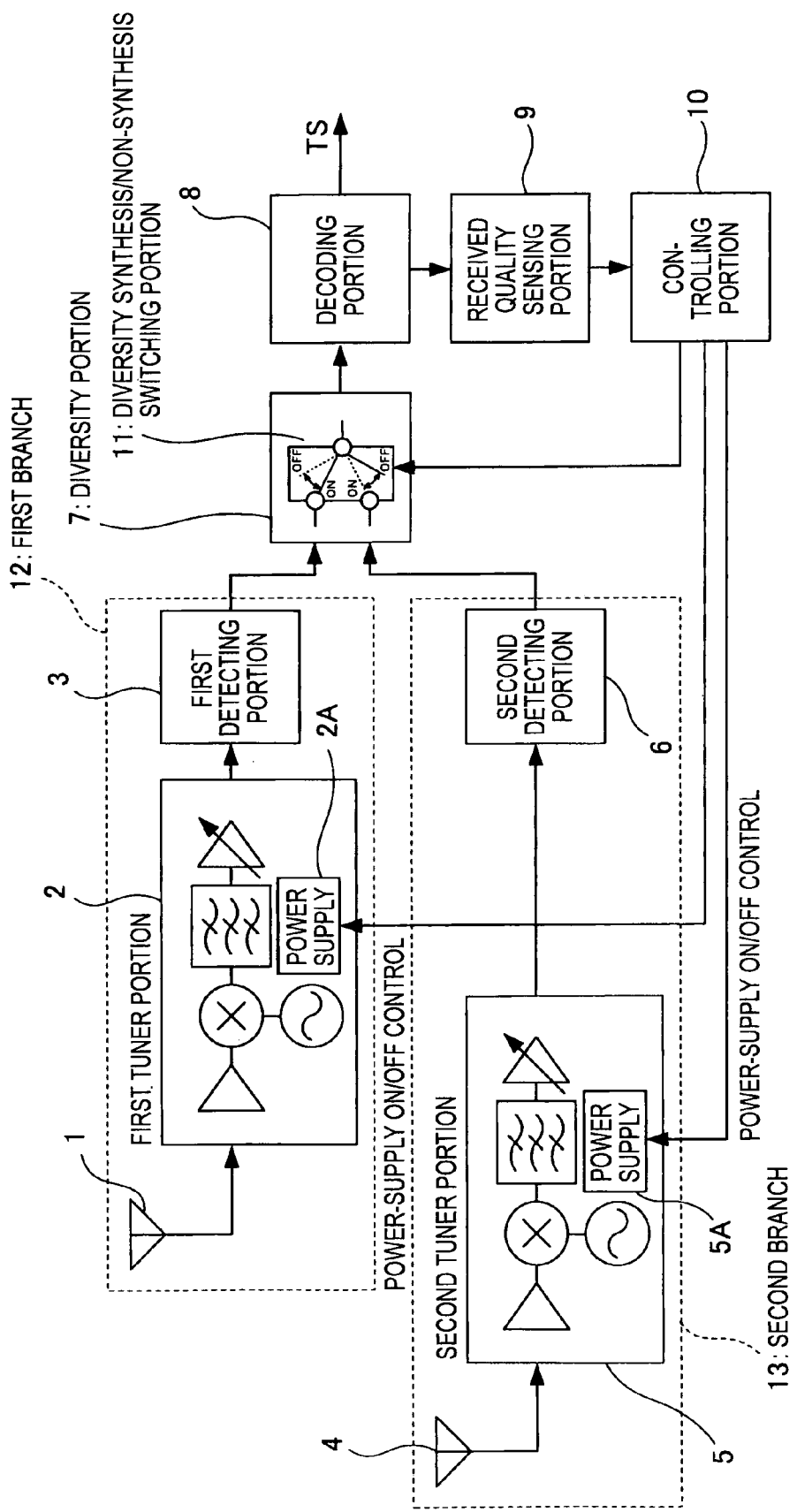
FIG. 1 is a block diagram showing a schematic configuration of a diversity receiving device according to Embodiment 1 of the present invention.

DESCRIPTION OF REFERENCE NUMERALS 1 first antenna
2, 20 first tuner portion
2A, 5A power supply
3 first detecting portion
4 second antenna
5, 50 second tuner portion
6 second detecting portion
7, 70 diversity portion
8 decoding portion
9 received quality sensing portion
10 controlling portion
11 diversity synthesis/non-synthesis switching portion
12, 120 first branch
13, 130 second branch
20A, 50A high-frequency amplifier

BEST MODE FOR CARRYING OUT THE INVENTION

Preferred embodiments for carrying out the present invention will be explained in detail with reference to the drawings hereinafter.

FIG. 1 is a block diagram showing a schematic configuration of a diversity receiving device according to Embodiment 1 of the present invention. In FIG. 1, the diversity receiving device of the present embodiment is used in a mobile terminal that can receive the digital terrestrial broadcasting. This diversity receiving device is constructed to include a first antenna 1, a first tuner portion 2 for turning in to a desired channel from a digital modulation signal caught by the first antenna 1, a first detecting portion 3 for detecting a signal chosen by the first tuner portion 2, a second antenna 4, a second tuner portion 5 for turning in to a desired channel from the digital modulation signal caught by the second antenna 4, a second detecting portion 6 for detecting a signal chosen by the second tuner portion 5, a diversity portion 7 for applying a diversity signal processing to the signals that are detected by the first detecting portion 3 and the second detecting portion 6 respectively, a decoding portion 8 for decoding the signal that is subjected to the diversity signal processing in the diversity portion 7, a received quality sensing portion 9 for sensing the received quality such as BER (Bit Error Rate), PER (Packet Error Rate), CNR (Carrier to Noise Ratio), or the like from decoded data from the decoding portion 8, and a controlling portion 10 for controlling start/stop of the diversity reception based on the received quality from received quality sensing portion 9.

In this case, the first antenna 1, the first tuner portion 2, and the first detecting portion 3 constitute a first branch 12, and the second antenna 4, the second tuner portion 5, and the second detecting portion 6 constituent a second branch 13. The present embodiment provides the two-branch diversity receiving device equipped with the first branch 12 and the second branch 13.

The first tuner portion 2 has a power supply 2A that can be turned ON/OFF from the outside, and is controlled by the controlling portion 10. The second tuner portion 5 has a power supply 5A that can be turned ON/OFF from the outside, and is controlled by the controlling portion 10, like the first tuner portion 2. The diversity portion 7 executes the diversity by using the well-known maximum ratio combining. In this case, the maximum ratio combining is explained in "Modulation/Demodulation in Digital Radio Communication, Yoichi Saitoh, The institute of Electronics, Information, and Communication Engineers, pages 190-191", for example. The diversity portion 7 has a diversity synthesis/non-synthesis switching portion 11 that switches the receiving mode between the diversity reception and the single reception. This diversity synthesis/non-synthesis switching portion 11 controls a ratio, at which the diversity receiving operation is turned ON/OFF, periodically or at random, and is controlled by the controlling portion 10.

The controlling portion 10 has a sequencer, a memory as a program storage area, and a PN (Pseudo Noise) signal generating circuit. The controlling portion 10 makes both a decision to switch the receiving mode between a single branch reception (single reception) and the diversity reception in response to BER as one of the received quality and a control to change a diversity gain, in the diversity receiving operation. The controlling portion 10 may be composed fully or partially of a hardware logical circuit.

Figure 2:
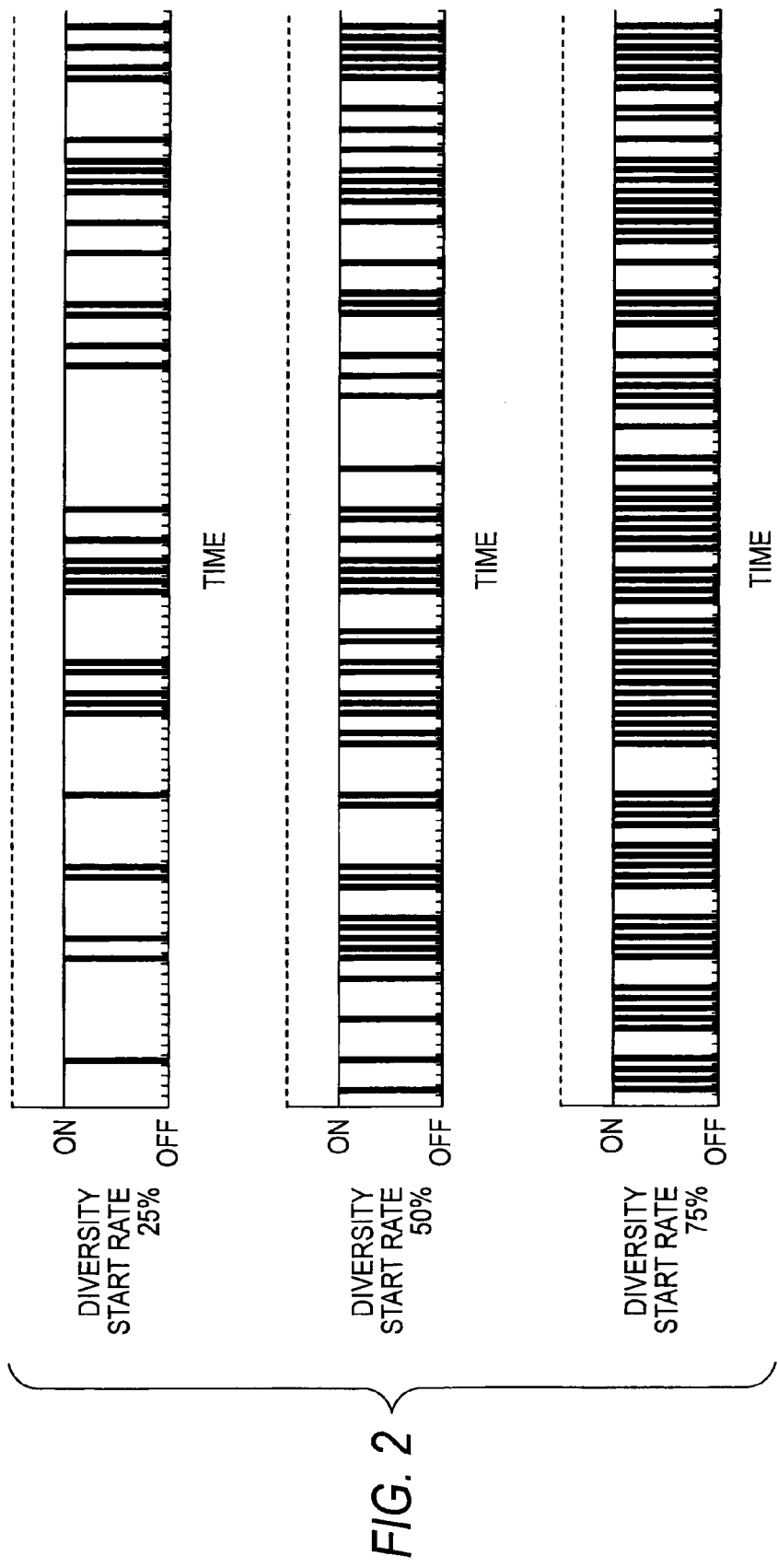
FIG. 2 is views showing a start rate of the diversity receiving device according to Embodiment 1 of the present invention in the diversity reception respectively.

Next, a concrete method of changing the diversity gain will be explained with reference to FIG. 2, FIG. 3, and FIG. 4 hereunder. FIG. 2 is views showing an example of a PN signal that the controlling portion 10 generated in receiving the diversity, respectively. In FIG. 2, the PN signals at a diversity start rate 25%, a diversity start rate 50%, and a diversity start rate 75% are illustrated. The controlling portion 10 controls the diversity synthesis/non-synthesis switching portion 11 in the diversity portion 7 such that the diversity is turned ON (i.e., the diversity receiving operation) when the PN signal is Hi and also the diversity is turned OFF (i.e., the single branch receiving operation) when the PN signal is Low. Although not shown, it is apparent that the diversity is turned OFF (Low) over a full range at a diversity start rate 0% and the diversity is turned ON (Hi) over a full range at a diversity start rate 100%. Also, there is no limitation on a minimum unit of an ON time, but it is desirable that a minimum time should be set roughly equal to a data symbol time. Also, no difference of the PN signal is caused due to a difference in the diversity start rate.

Figure 3:
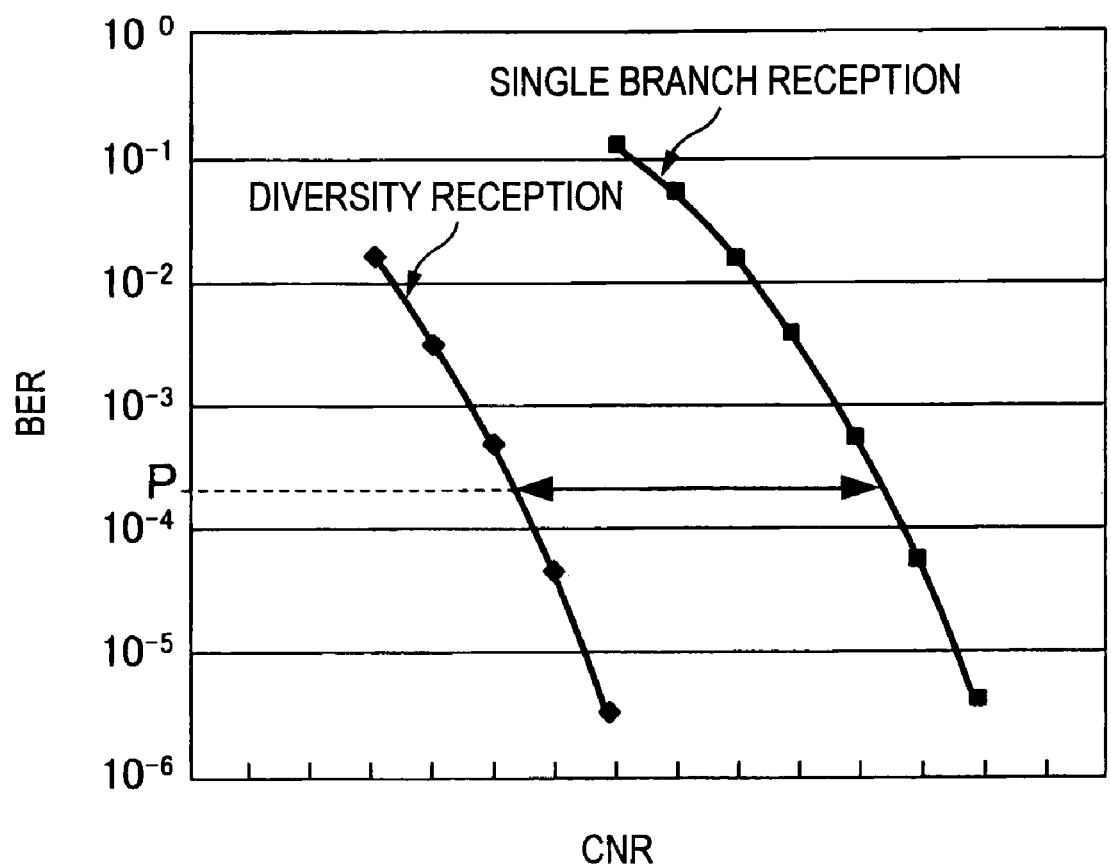
FIG. 3 is a view showing the diversity gain variable characteristic in the diversity receiving device according to Embodiment 1 of the present invention.

As shown in FIG. 3, for example, the diversity gain of a dB is obtained at a sensitivity point P ($2 \times 10^{-4}$) by the maximum ratio combining. FIG. 3 shows en example of the computer simulation result of BER after the Viterbi decoding is applied.

Figure 4:
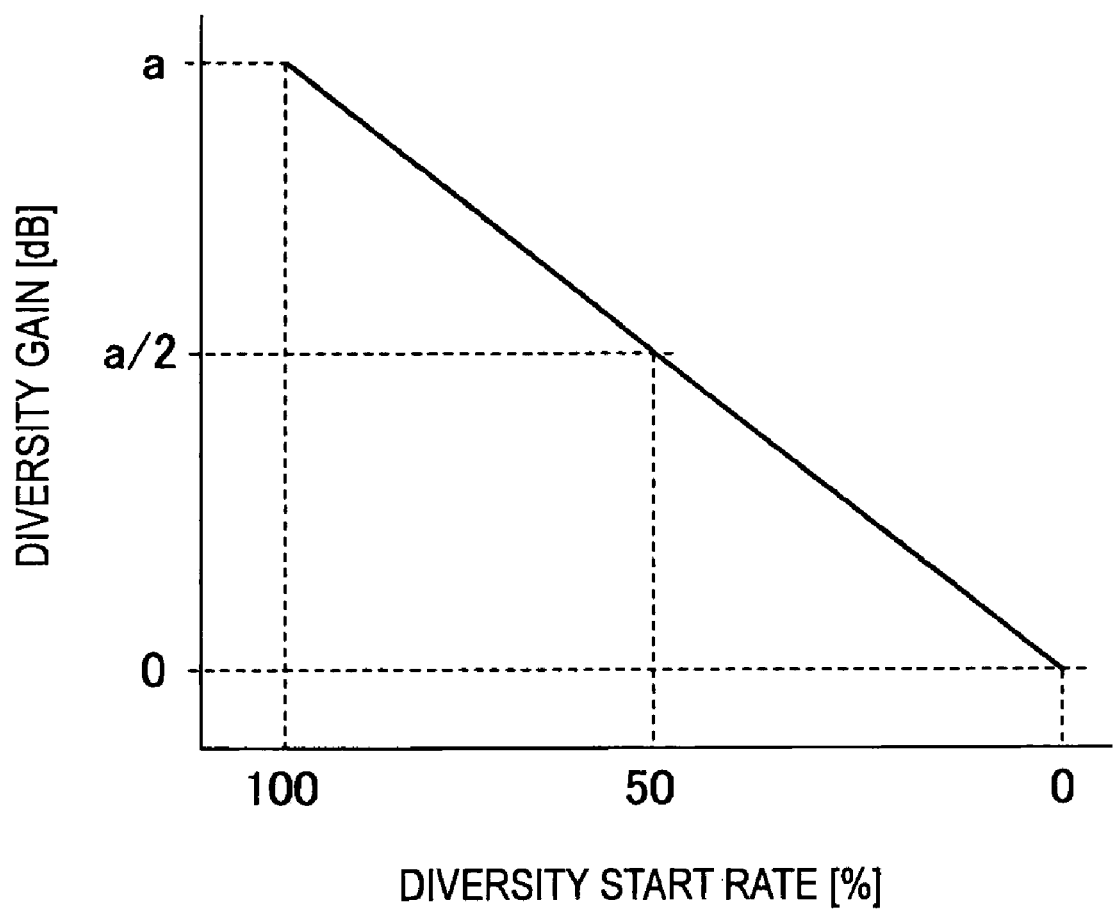
FIG. 4 is a view showing a relationship between a diversity start rate and a diversity gain in the diversity receiving device according to Embodiment 1 of the present invention.

FIG. 4 is a view showing a change of the diversity gain when the diversity synthesis/non-synthesis switching portion 11 in the diversity portion 7 is controlled at a diversity start rate 0%, 25%, 50%, 75%, and 100%. As can be seen from FIG. 4, the diversity gain is varied by changing the diversity start rate. The diversity synthesis/non-synthesis switching portion 11 functions as a switch processing portion that switch the synthesis ON/OFF of the diversity portion 7 to get the characteristic shown in FIG. 3. In this case, an output of the first branch and an output of the second branch are synthesized at a time of the synthesis ON. Also, an output of the first branch and an output of the second branch are not synthesized at a time of the synthesis OFF, and any one output is output as it is.

Next, an operation of the diversity receiving device according to the present embodiment will be explained hereunder. Here, one segment broadcasting will be explained by way of example. In turn, a transmission spectrum of the digital terrestrial television broadcasting is constructed by connecting 13 OFDM (Orthogonal Frequency Division Multiplexing) blocks (also called the OFDM segment), each of which is obtained by divining the channel bandwidth of the television broadcasting into 14 blocks (see "A transmission system of the Digital Terrestrial Television Broadcasting, Standard Specification, An outline of an ISDB-T system, Second Chapter, page 8, Association of Radio Industries and Business").

The first antenna 1 and the second antenna 4 are a television UHF band receiving antenna respectively. Also, the first tuner portion 2 and the second tuner portion 5 are a one segment receiving tuner module respectively. Also, the first detecting portion 3 and the second detecting portion 6 execute FFT (Fast Fourier Transform) and the channel estimation respectively. The diversity portion 7 executes of phase and amplitude control for the maximum ratio combining and a switching process to switch. ON/OFF of the diversity operation. The decoding portion 8 executes the deinterleaving process of a frequency and a time, the carrier demodulation, and the Viterbi decoding and the Reed-Solomon decoding, and sends out a TS (Transport Stream) packet signal. The received quality sensing portion 9 outputs the BER in the single branch reception state and the diversity reception state and the CNR values of the first branch 12 and the second branch 13. As the measure that defines a sensitivity, the BER after the Viterbi decoding is less than $2 \times 10^{-4}$ (sensitivity point). When an error is generated further more, degradation is caused such that a noise is generated in the image.

Here, in a situation that the broadcast is received via a single branch of the first branch 12, when the received quality sensing portion 9 detects BER>$2 \times 10^{-4}$, i.e., an error of $2 \times 10^{-4}$ or more caused by the change in the receiving environments, e.g., caused due to transit by an electric train, change of the receiving place, or the like, the controlling portion 10 feeds a power to the second branch 13, which is not operated, to start the diversity reception, so that the diversity reception is set.

After the receiving state is stabilized by starting the diversity reception, when the received quality sensing portion 9 senses the BER indicating that an error is satisfactorily reduced, i.e., the BER of $2\times10$-5 or less, the controlling portion 10 specifies the branch whose CNR value is lower from the received quality sensing portion 9. Then, the controlling portion 10 controls the received signal from the specified branch by a predetermined PN signal at a random ON/OFF ratio. That is, the controlling portion 10 changes the diversity gain. As already explained, when the diversity operation is controlled at a rate of a diversity start rate 100%, a diversity start rate 75%, a diversity start rate 50%, a diversity start rate 25% and a diversity start rate 0% (single branch reception), the diversity gain can be changed as shown in FIG. 4. Therefore, the controlling portion 10 lowers the diversity gain by switching the diversity start rate from 100% to 75%. Then, the controlling portion 10 observes the BER after a time t1, then stops the diversity-stop deciding operation when the BER is in excess of $2\times10$-4, then restores the operation mode to the normal operating condition at the diversity start rate 100%, and then continues the receiving operation. In this event, it is desirable that a waiting time t1 required until the BER observation should be set a time equivalent to 2 frames when the parameter l concerning the time interleave is l=2, and a time equivalent to 4 frames or more when l=4.

When a time t1 elapsed after the diversity start rate is switched from 100% to 75%, the BER that is below $2\times10$-4 is observed. Then, the controlling portion 10 continues the diversity-stop deciding operation and then switches the diversity start rate from 75% to 50%. Then, when the BER of $2\times10$-4 or more is observed after a time t1, the controlling portion 10 stops the diversity-stop deciding operation, then restores the operation mode to the operating condition at the diversity start rate 100%, and then continues the receiving operation. In contrast, when the BER is below $2\times10$-4, the controlling portion 10 switches the diversity start rate to 25% and makes the similar decision. Finally, when the condition of BER<$2\times10$-4 is satisfied in the 0% diversity reception (single branch reception), the controlling portion 10 executes the power stop process of the specified branch whose CNR is low, and shifts the receiving mode to the single branch reception.

In this manner, according to the diversity receiving device of the present embodiment, the receiving mode is put close to the state of the single branch reception by lowering gradually the diversity gain in the diversity reception, and then the control continue/stop decision is made while observing the BER indicating the received quality in the course of the above step. Therefore, the stable receiving characteristic can be ensured. Also, since the switching decision between the diversity reception and the single branch reception is made by using the BER as a decision parameter, the present receiving characteristic can be sensed irrespective of the fading condition. Therefore, the diversity stop can be decided stably in various fading environments. As a result, a power consumption can be reduced by shutting down the power supply (the power supply 2A of the first tuner portion 2 or the power supply 5A of the second tuner portion 5) of the stopped branch. Also, a circuit scale can be reduced rather than the prior art where a decision is made based on the field strength or the fading pitch, and a reduction of a cost can be attained.

In this event, in the present embodiment, the reference BER value (sensitivity point) in respective deciding operations is set to $2\times10$-4. But (1) the BER value used to start the diversity reception from the single branch reception, (2) the BER value used to start the diversity gain variable operation from the diversity start rate 100%, or (3) the BER value used to decide whether or not the diversity should be lowered further from the start of the diversity gain variable operation may be set individually respectively. For example, an example using above (2) and (3) will be explained herein. The diversity gain is lowered when a state that the received quality is below the BER value in (2) (a first threshold, or more) is obtained continuously for a time t1 or more in the diversity reception, and then the diversity gain is lowered further when a state in which the received quality is below the BER value in (3) (a second threshold, or more) is obtained after a time t2 elapsed to pass through the time t1. Then, the stop control is applied to that branch when the received quality that is below the BER value in (3) (a second threshold, or more) after a time t2 elapsed is obtained in a state that the diversity gain is lowered up to the previously set lower limit, and then the gain varying operation is stopped when the received quality exceeds the BER value in (3) (below a second threshold) after a time t2 elapsed after the diversity gain is lowered.

Also, in the present embodiment, the case where the power supply of the branch specified such that the CNR is low is shut down is explained. But a power supply of a predetermined branch may be shut down.

Also, in the present embodiment, the case where a supply of a power to the first tuner portion 2 and the second tuner portion 5 is controlled in the first branch 12 and the second branch 13 respectively is explained. But a supply of a power including the first detecting portion 3 and the second detecting portion 6 may be controlled.

Figure 5:
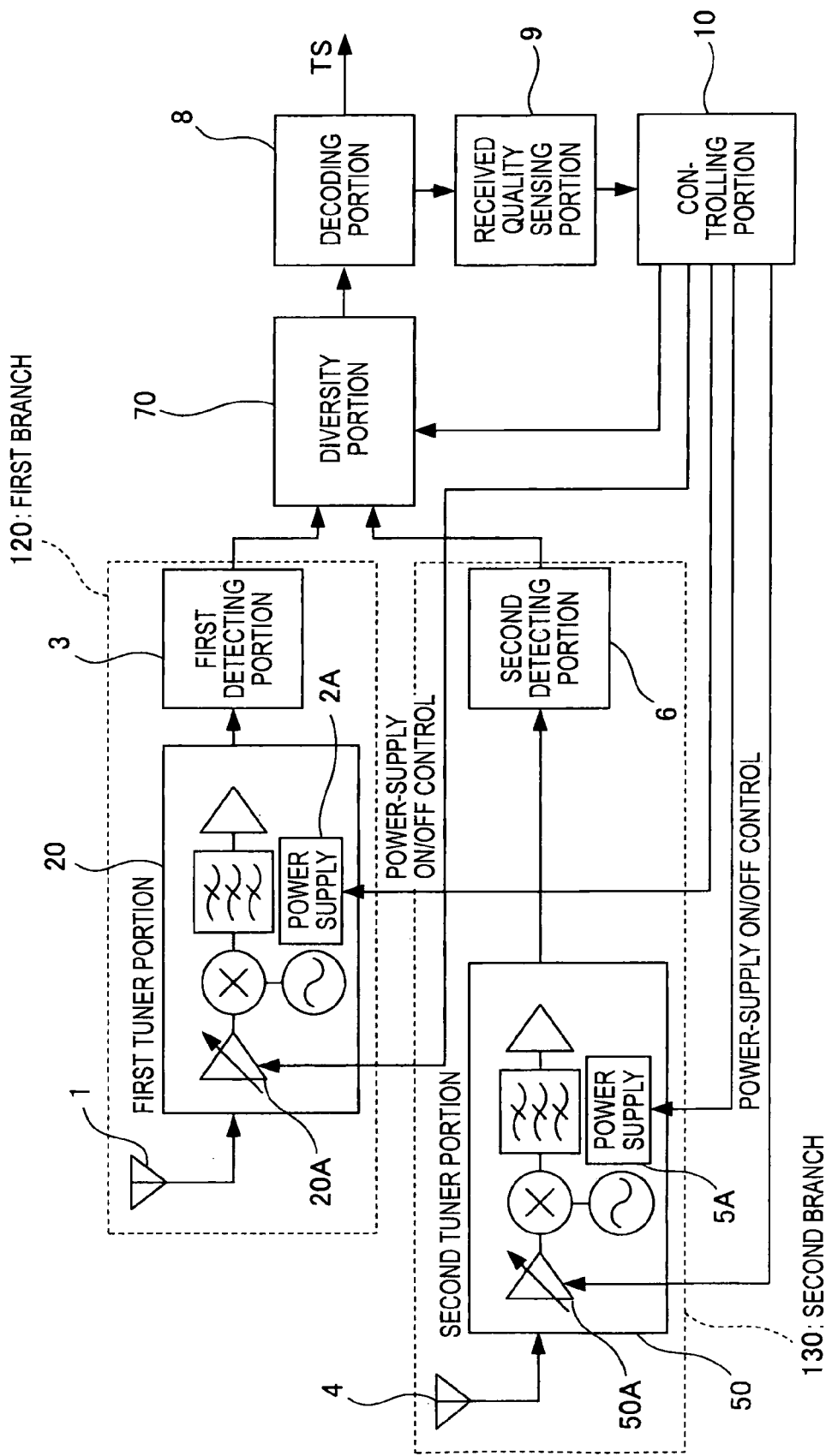
FIG. 5 is a block diagram showing a schematic configuration of a diversity receiving device according to Embodiment 2 of the present invention.

Next, Embodiment 2 of the present invention will be explained hereunder. FIG. 5 is a block diagram showing a schematic configuration of a diversity receiving device according to Embodiment 2 of the present invention. In above Embodiment 1, the diversity gain is changed by controlling the ON/OFF ratio of the diversity receiving operation periodically or at random. But the present embodiment is different in that the diversity gain is changed by controlling a gain of a high-frequency amplifier 20A in a first tuner portion 20 and a gain of a high-frequency amplifier 50A in a second tuner portion 50 respectively.

Then, the diversity stop decision is made by observing the BER during the diversity reception such that the gain of the high-frequency amplifier 20A or the high-frequency amplifier 50A in the predetermined branch or the branch whose received quality is low is controlled. With this arrangement, like Embodiment 1, the present receiving characteristic can be detected irrespective of the fading condition or the transmission parameter condition. The diversity stop decision can be made stably in various fading circumstances. As a result, a power consumption can be reduced by shutting down the power supply of the stopped branch (the power supply 2A of the first tuner portion 20 or the power supply 5A of the second tuner portion 50). A diversity portion 70 of the diversity receiving device according to the present embodiment does not execute a switching process of switching ON/OFF of the diversity operation, but executes merely the phase and amplitude control for the maximum ratio combining. The diversity portion 70 of the present embodiment either executes the synthesis of an output of a first branch 120 and an output of a second branch 130 or passes through any one output as it is. The diversity portion 70 does not have the diversity synthesis/non-synthesis switching portion t1 in the diversity portion 7 of Embodiment 1.

In this manner, according to the diversity receiving device of the present embodiment, the gain of the high-frequency amplifier 20A or the high-frequency amplifier 50A in the predetermined branch or the branch whose received quality is low is controlled. Therefore, like the diversity receiving device of Embodiment 1, a stable receiving characteristic can be ensured and a reduction of a power consumption of the stopped branch can be attained by deciding the diversity stop. Also, a circuit scale can be made small in contrast to the prior art, and a cost reduction can be attained.

Figure 6:
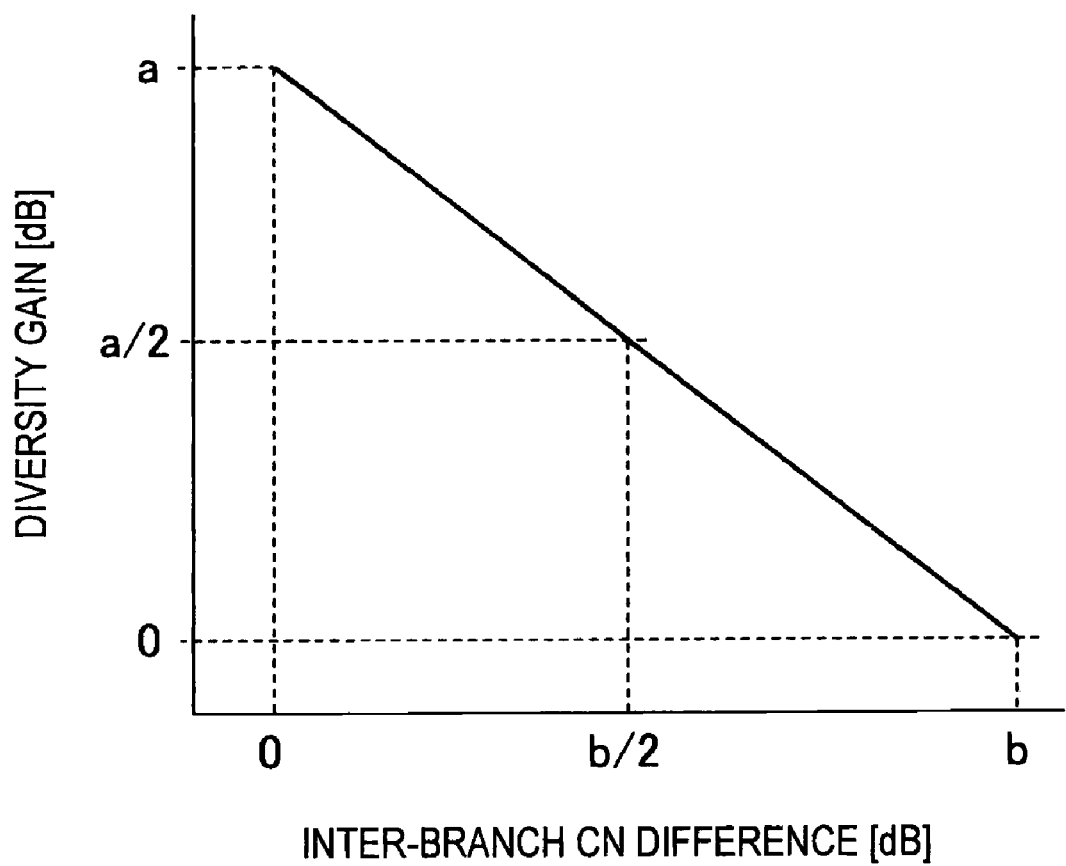
FIG. 6 is a view showing a relationship between an inter-branch CN difference and a diversity gain in the diversity receiving device according to Embodiment 2 of the present invention.

In this case, in the present embodiment, the gain of the high-frequency amplifier 20A in the first tuner portion 20 and the gain of the high-frequency amplifier 50A in the second tuner portion 50 are controlled. But the diversity gain may be controlled between the branches by changing its weight. FIG. 6 is a view showing an example showing how the diversity gain is changed according to the CN difference between the branches. The diversity gain has the largest value a dB when the CN difference between the branches is 0 dB, and has the smallest value 0 dB when the CN difference is b dB. The phase may be controlled except the gain control between the branches.

The present invention is explained in detail with reference to the particular embodiments as above. But it is apparent for those skilled in the art that various variations and modifications can be applied without departing from a spirit and a scope of the present invention.

INDUSTRIAL APPLICABILITY

The present invention possesses such an advantage that a power consumption can be reduced to the utmost extent while keeping a predetermined received quality without measurement of the electric field strength and the fading pitch, and is applicable to the cellular phone, the car navigation system, or the like, which is able to receive the digital terrestrial broadcasting.

The invention claimed is:

1. A diversity receiving device for switching a receiving mode between a diversity reception using a plurality of branches and a single reception using a single branch, comprising:
   a diversity synthesis/non-synthesis switching portion which switches a receiving mode between the diversity reception and the single reception;
   a received quality sensing portion which senses a received quality; and
   a controlling portion which reduces a diversity gain by a predetermined value by controlling the diversity synthesis/non-synthesis switching portion in the diversity reception, and stops a receiving operation of a predetermined branch or a branch whose received quality is low when a value of the received quality sensed by the received quality sensing portion is equal to or greater than a previously set value after the diversity gain is reduced by the predetermined value.

2. The diversity receiving device according to claim 1, wherein the controlling portion shuts down a supply of power to all circuit or a partial circuit of the branch whose receiving operation is stopped.

3. The diversity receiving device according to claim 1, wherein the diversity synthesis/non-synthesis switching portion controls an ON/OFF ratio of the diversity receiving operation periodically or at random to vary the diversity gain.

4. The diversity receiving device according to claim 1, wherein the controlling portion controls a gain of a high-frequency amplifier circuit of a predetermined branch or a branch whose received quality is low in the diversity reception.

5. The diversity receiving device according to claim 1, wherein the controlling portion lowers the diversity gain when a state that the received quality is equal to or greater than a first threshold is obtained continuously for a time t1 or more in the diversity reception, lowers further the diversity gain when a state that the received quality is equal to or greater than a second threshold is obtained after a time t2 that passes through the time t1, executes stop control of the concerned branch when the received quality is equal to or greater than the second threshold after the time t2 elapsed in a state that the diversity gain is lowered up to a previously set lower limit, and stops a gain varying operation when the received quality is smaller than the second threshold after the time t2 elapsed after the diversity gain is lowered.

6. The diversity receiving device according to claim 1, wherein, when a transmission parameter for deciding a range of a time interleave for an OFDM-modulated signal is changed, the controlling portion changes a time t2 being set previously a time interleave parameter into a time t3.

7. A mobile terminal equipped with the diversity receiving device set forth in claim 1.

8. A diversity receiving method of switching a receiving mode between a diversity reception using a plurality of branches and a single reception using a single branch, comprising:
   sensing a received quality;
   controlling a ratio of a diversity synthesis/ non-synthesis periodically or at random;
   reducing a diversity gain by a predetermined value by controlling a diversity synthesis/ non-synthesis switch in the diversity reception; and
   stopping a receiving operation of a predetermined branch or a branch whose received quality is low when the received quality sensed by the received quality sensing portion is equal to or greater than a previously set value.

9. A diversity receiving method of switching a receiving mode between a diversity reception using a plurality of branches and a single reception using a single branch, comprising:
   sensing a received quality;
   controlling a ratio of a diversity synthesis/ non-synthesis by controlling a gain of high-frequency amplifier circuit of each branch or a weighting of an output of each branch;
   reducing a diversity gain by a predetermined value by controlling a diversity synthesis/ non-synthesis switch in the diversity reception; and
   stopping a receiving operation of a predetermined branch or a branch whose received quality is low when the received quality sensed by the received quality sensing portion is equal to or greater than a previously set value.

* * * * *